Jan. 21, 1930.　　　M. K. MARKMAN　　　1,744,321
SIGN SUPPORT
Filed Dec. 17, 1926
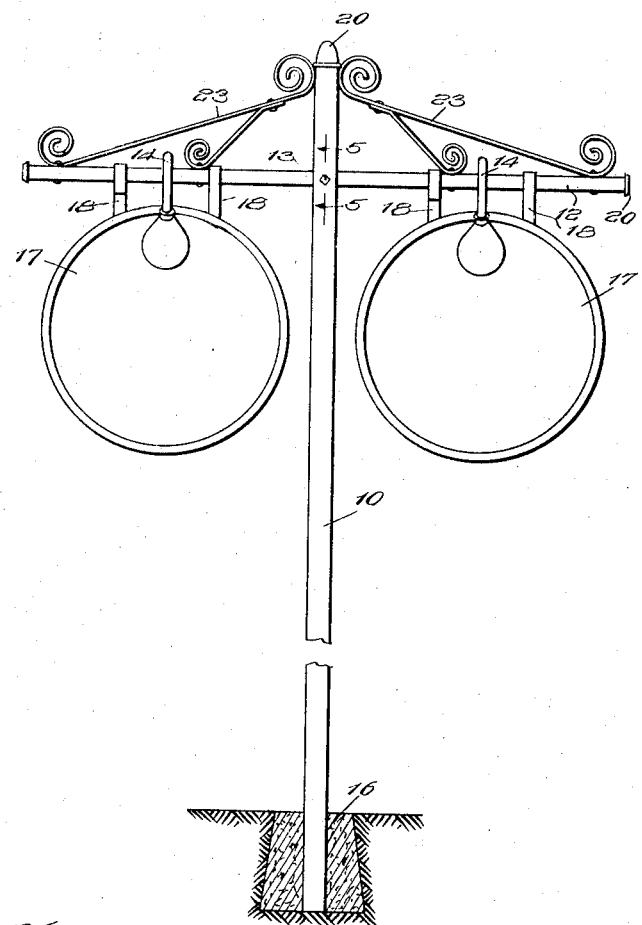
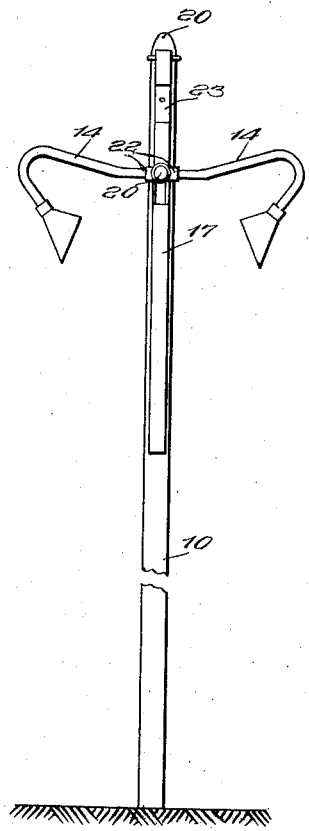
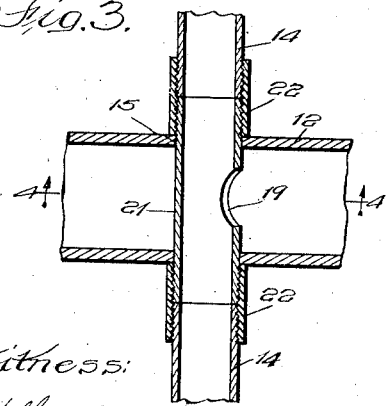
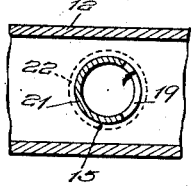
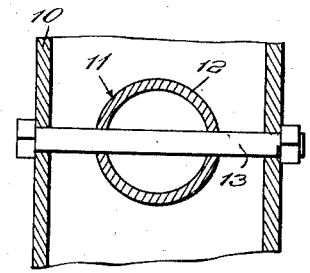
Inventor:
Milton K. Markman Patented Jan. 21, 1930

1,744,321

UNITED STATES PATENT OFFICE

MILTON K. MARKMAN, OF CRYSTAL LAKE, ILLINOIS

SIGN SUPPORT

Application filed December 17, 1926. Serial No. 155,459.

This invention relates to sign supports of tubular construction and contemplates particularly an improved means of joining or securing laterally disposed cross-arms or fixtures to the support therefor.

This invention is designed to eliminate the use of various unions or attachments heretofore required in forming a connection between angularly disposed tubular members, and it is therefore an object thereof to produce a connection of such parts, having maximum firmness and rigidity with a minimum expenditure of labor and cost.

With the above and other objects in view, as will be apparent, this invention consists in the construction, combination and arrangement of parts all as hereinafter more fully described, claimed and illustrated in the accompanying drawings wherein:

Fig. 1 is a front elevation of a complete sign with cross-arms embodying the means of connection forming the subject matter of this invention.

Fig. 2 is a side view of the same.

Fig. 3 is an enlarged fragmentary cross-sectional view of transverse light fixture members embodying the principles of this invention.

Fig. 4 is an enlarged fragmentary cross-sectional view taken on line 4—4 of Fig. 3.

Fig. 5 is an enlarged fragmentary cross-sectional view taken on line 5—5 of Fig. 1.

In the construction of sign supports heretofore involving the connection of a number of pipes or similar tubular members, fittings such as ells, T-unions, and the like have been commonly used for forming a strong union of the parts. Since these prior fittings involve the cutting and threading of the tubular members which combine to form the supports, the resulting supports have been expensive and therefore it is desirable to provide a support with a minimum number of connections which will eliminate the necessity of cutting and threading the tubular members and the use of various types of unions. Accordingly, this invention contemplates a means of producing a complete union of laterally disposed members or cross-arms with their supporting structure, without the use of the commonly known fittings of various types, thereby reducing the manufacturing cost of a sign support and at the same time providing a connection of not only sufficient but of greater rigidity and stability for the purpose it serves.

To attain the foregoing result, a desired length of metal tubing, which constitutes the main support, is provided with a pair of aligned retaining apertures formed therein at a predetermined distance from one of its ends. These apertures are formed to correspond with the periphery of a tubular cross-arm of relatively smaller diameter than the diameter of the support to allow the entry thereof through the apertures and thus provide a double cross-arm on the main support. In order to maintain the cross-arm in position the vertical or main tubular member is pierced by a pair of apertures on a diameter transversely located with respect to the cross-arm. A bolt is passed through these second openings which securely anchors the cross-arm in position. In the event it is desired to attach a single cross-arm on said main support, i. e. a cross-arm located entirely to one side of the said main support, only one retaining aperture is provided in a wall of the support instead of a pair of aligned retaining apertures. Hence, instead of passing through both sides of the main support, the connecting end of the cross-arm after passing through the single aperture on one side of the main support, rests or abuts against the interior of the wall on the side of the main support opposed to the single retaining aperture. The foregoing principles of connection are not limited to the union of a cross-arm to the main support but, as is apparent, may be equally applied to the connection of lighting fixtures to the cross-arm. It is also to be noted that the present structure can be applied to square as well as round tubes.

For the purpose of describing the invention herein, the same is shown in Fig. 1 applied to the standard double hanging sign support, having an upright member or main support 10 anchored in a block of concrete or suitable foundation material 16 by which it is held in the ground. A pair of aligned retaining apertures 11 are formed in the upper end of the main support 10 and are adapted to receive the cross-arm 12 and permit it to extend upon each side of the main support 10. When the cross-arm 12 is adjusted to extend the desired distance from either side of the main support 10, the position of the intersection may be securely fixed by means of a bolt 13 which is arranged to pass through the walls of the main support 10 transversely to the cross-arm 12 and through the section of the cross-arm confined therein, as shown in Fig. 5. The cross-arm 12 provides supporting means for a disk 17 or other suitable sign material, on both sides of the main support 10. Attachment of the disk to the cross-arm 12 is afforded by means of the usual and ordinary metal strip 18.

It will be understood from the aforesaid description that in the event the sign is desired to be of a single cross-arm type as distinguished from the double cross-arm arrangement heretofore discussed and shown in Fig. 1, such a support may be provided by means of a single retaining aperture 11 in one side of the main support 10 instead of a pair of aligned apertures. Accordingly the end of the cross-arm 12 to be attached to the main support 10 can be received in the said aperture to abut against the wall opposed to said aperture and be held within the confines of said main support 10 by means of the bolt 13 in the manner heretofore set forth.

When illumination is desired for the sign, a standard lighting fixture 14 of tubular material can be connected to the cross-arm 12 as shown in Fig. 3, according to the principle of the connection of the cross-arm 12 and the main support 10.

For the purpose of mounting the lighting fixtures 14 without severing the cross-arm, or the use of standard unions, the cross-arm 12 is transversely apertured as at 15 for the reception of a tubular nipple 21. This tubular nipple 21 passes transversely through the cross-arm 12 and projects beyond the walls thereof. The projecting ends of the nipple 21 are threaded and its body medially of its length is provided with an aperture 19 through which wires may pass into the nipple. The lighting fixtures 14 having their inner ends threaded, are aligned with the ends of the nipples 21 and secured thereto by the threaded sleeves 22 which engage the threaded ends of the fixtures 14 and the nipple 21. By this construction the lighting fixtures are held in place and supported by the nipple 21 which in turn is secured or clamped in position by the sleeves 22. Should it be desired to have only a single lighting fixture 14 located on one side of the cross-arm 12, the end of the nipple 21 having no fixture thereon may be capped. In this event the cap (not shown) takes the place of one sleeve in clamping the nipple in place.

Suitable caps or plugs 20 may be fixed on or in the exposed openings at the ends of the cross-arm 12, and main support 10.

Heretofore in the mounting of signs similar to that disclosed in the present invention, chains have been interposed between the upper end of the vertical support 10 and the outer end of the cross-arm 12. Such an arrangement does not present any resistance to wind pressure. Furthermore, where a threaded structure or connection is involved there is a certain amount of side play and a general weakening of the connection. The present invention overcomes these objectionable characteristics in the signs which have gone before by the elimination of all threads in the connection between the cross-arm 10 and by the use of ornamental iron connections 23 between the upper end of the support 10 and the outer end of the cross-arm 12. This ornamental iron work being made of flat strip metal constitutes a rigid, substantial connection and presents its greatest strength to the wind pressure against the sign 17.

From the foregoing it will readily be seen that a sign support is provided which eliminates all threaded unions and creates a more substantial rigid structure, at the same time reducing the cost thereof.

What is claimed is:

1. The combination with a hollow support having transverse openings therein, a nipple mounted in said opening and having threaded terminals projecting beyond the confines of said support, lighting fixtures, and means embracing said threaded terminals and lighting fixtures for securing the lighting fixtures to the projecting ends of said nipple.

2. The combination with a hollow support having a pair of openings therein adapted to receive and hold a nipple, said nipple having terminals projecting beyond the confines of said support beyond opposite walls thereof, lighting fixtures, and means engaging opposite ends of said nipple for securing the lighting fixtures to the projecting ends of said nipple and clamping said nipple in place.

3. The combination with a hollow support adapted to have electric wires therein, of a hollow nipple extending transversely through and beyond said support, said nipple having a medial opening therein for the admission of the wires in the support, a light fixture secured to the end of said nipple the securing means thereof being disclosed on opposite sides of the hollow support.

4. The combination with a hollow support adapted to have wires pass therethrough, of a hollow nipple extending transversely through and beyond said support, said nipple having its ends threaded and a medial opening therein aligning with the passage in the support, light fixtures, and interiorly threaded sleeves cooperating with the light fixtures and the ends of the nipple to secure the fixtures to the nipple and clamp the nipple in place.

5. The combination with a support having a wire passage therein, of a tubular nipple extending transversely through and beyond said support, said nipple having a medial opening aligned with the passage of the support, a light fixture, and means cooperating with the nipple and fixture for mounting the fixture and securing the nipple in place.

MILTON K. MARKMAN.